US007464726B2

(12) United States Patent
Mertes et al.

(10) Patent No.: US 7,464,726 B2
(45) Date of Patent: Dec. 16, 2008

(54) MODULAR SYSTEM WITH CAPTIVATED FASTENER ASSEMBLIES

(75) Inventors: Christopher J. Mertes, Twinsburg, OH (US); Daniel E. Zeiler, Mentor, OH (US)

(73) Assignee: Swagelok Company, Solon, OH (US)

( * ) Notice: Subject to any disclaimer, the term of this patent is extended or adjusted under 35 U.S.C. 154(b) by 125 days.

(21) Appl. No.: 11/363,357

(22) Filed: Feb. 27, 2006

(65) Prior Publication Data

US 2006/0214475 A1 Sep. 28, 2006

Related U.S. Application Data

(60) Provisional application No. 60/657,232, filed on Feb. 28, 2005.

(51) Int. Cl.
*F16K 27/00* (2006.01)

(52) U.S. Cl. ...................................... 137/884; 411/383

(58) Field of Classification Search ................. 137/884; 411/383, 384, 432; 403/21, 297
See application file for complete search history.

(56) References Cited

U.S. PATENT DOCUMENTS

| | | | | |
|---|---|---|---|---|
| 2,651,324 | A | 9/1953 | Hodgson et al. | |
| 3,204,586 | A * | 9/1965 | Marsh, Jr. | 52/584.1 |
| 4,848,405 | A | 7/1989 | Albrecht | |
| 5,020,570 | A * | 6/1991 | Cotter | 137/596.12 |
| 5,305,788 | A | 4/1994 | Mayeux | |
| 5,361,805 | A | 11/1994 | Mayeux | |
| 5,558,129 | A | 9/1996 | Mayeux | |
| 5,860,676 | A | 1/1999 | Brzezicki et al. | |
| 6,095,736 | A * | 8/2000 | Miller et al. | 411/384 |
| 6,619,321 | B2 | 9/2003 | Reid, II et al. | |
| 6,763,848 | B2 * | 7/2004 | Rondreux et al. | 137/269 |
| 6,951,226 | B2 * | 10/2005 | Eriksson et al. | 137/884 |
| 7,204,272 | B2 * | 4/2007 | Steinberg | 137/884 |
| 2002/0020451 | A1 | 2/2002 | Reid, II et al. | |
| 2004/0168732 | A1 | 9/2004 | Perusek et al. | |

FOREIGN PATENT DOCUMENTS

| | | |
|---|---|---|
| DE | 1 159 701 | 12/1963 |
| DE | 44 10 227 | 9/1995 |
| EP | 111 958 | 6/1984 |

OTHER PUBLICATIONS

Circor Tech brochure, 33 pgs. Circor Tech Diaphragm Valves.
Stream-Select, Switching, and Shutoff Valve Assemblies brochure, 8 pgs., copyright 2002, Swagelok Company, printed USA.
Parker R-max Stream Switching System Catalog 4140-R, 12 pgs., Jun. 2002, Parker Hannifin Corporation.
International Search Report from PCT/US06/006855.

* cited by examiner

*Primary Examiner*—John Fox
(74) *Attorney, Agent, or Firm*—Calfee Halter & Griswold LLP

(57) ABSTRACT

A modular flow system having individual modules that connect in a manner which allows for easy addition or removal of a module without the need for or risk of disturbing the connection between all modules. The system may include a first base having a through bore in which a fastener is disposed. The first base may include portions or components adapted to capture or retain the fastener within the bore. While retained within the bore, the fastener may connect the first base to a second base.

42 Claims, 6 Drawing Sheets

MODULAR SYSTEM WITH CAPTIVATED FASTENER ASSEMBLIES

RELATED APPLICATIONS

This application claims the benefit of U.S. provisional patent application Ser. No. 60/657,232 for MODULAR SYSTEM USING CAPTIVATED FASTENERS filed Feb. 28, 2005, the entire disclosure of which is fully incorporated herein by reference

BACKGROUND OF THE INVENTION

Modular flow systems are common to process-related industries. For example, stream selecting/switching systems are commonly used in the analytical instrumentation market to route different fluids from multiple sources to a single analyzer. Often, a single automated process analyzer is used for analyzing multiple sample streams. Since automated process analyzers are expensive, using a single analyzer significantly reduces the cost of analyzing multiple gas and liquid sample streams in petrochemical plants, refineries and other process-related industries.

Sample streams are generally transported to a stream selecting/switching system by tubing or piping. The stream selecting/switching system selects a single sample stream from the multiple samples streams and routes the single stream to the analyzer. The number of sample streams and the desired system configuration can vary greatly depending on the industry and application. As a result, modular systems are preferred because they provide increased flexibility in customizing the system.

Modular stream selectors are commonly constructed of multiple valve assembly/base combinations or modules. A valve assembly is typically fastened to a base that contains a flow path for fluid to travel to the analyzer. The valve assembly can route a sample stream to the analyzer via the base. Multiple bases can connect to form a common flow path to the analyzer. To ensure a fluid tight attachment between two bases, seals are positioned between the bases and a method for applying force to the seals is used. Tie rods (a threaded rod with nuts on either end) are commonly used to connect the multiple bases together and apply force to the seals. With tie rods, an appropriate length tie rod must be selected based on the number of bases to be attached and all of the seal connections between the bases are formed at the same time as the tie rod is tighten down.

Another known approach to connecting multiple bases in a modular stream selector utilizes custom bolts that have both a male threaded end and a female threaded end. The bolts are threaded together such that the male end of one bolt threads into the female end of a second bolt. An example of this approach can be found in U.S. Pat. No. 6,619,321 B2. As the bolts are threaded into each other, equal torque is applied to each threaded joint. Thus, when a user attempts to remove the bolts in reverse order, a threaded joint may be loosened other than the threaded joint desired.

SUMMARY

The present invention generally relates modular flow systems. More particularly, the invention relates to a modular flow system concept having individual modules that connect in a manner which allows for easy addition or removal of a module without the need for or risk of disturbing the connection between all modules.

In accordance with one aspect of the present invention, a modular system is provided having modules that may be connected in series and may be disconnected, in reverse order, without disturbing the connection between the other modules. In one embodiment, an insert having a fastener receiving opening attaches to a first module and a fastener attaches a second module to the first module by engaging the fastener receiving opening.

In accordance with another aspect of the present invention, a modular system is provided which uses different torques on components which engage to aid in the correct order of disassembly of the components. In one embodiment, an first component is threaded into a first base and a second component is threaded into the first component at a torque lower than that used to install the first component. Thus, upon disassembly, the second component may be loosened and removed without loosening the first component.

In accordance with another aspect of the present invention, a modular system is provided having modules configured as a complete assembly of the components required to join the two modules together. In one embodiment, a first module base includes a through bore in which a fastener is captured. The fastener is adapted to engage with a second module base to connect the first base to the second.

In accordance with another aspect of the present invention, a modular system is provided where a connecting mechanism between the two modules, remains with one of the modules when disassembled. In one embodiment the module includes structural features that are adapted to capture or retain the connecting mechanism within a through bore. In one embodiment, the modular system includes a first base having a through bore in which a fastener is disposed. The system includes engaging surfaces which cooperate to retain the connecting mechanism within the bore when the module is disassembled. In one embodiment, a first engaging surface is a portion of an insert that attaches to the base and a second engaging surface is an interior shoulder of the base. In one embodiment, the fastener when captured within the bore, does not protrude from the base, thereby protecting the fastener from damage.

In accordance with one aspect of the present invention, a modular system is provided with structural features that aid in the alignment of modules or components during assembly. In one embodiment, an insert attaches to a first module while extending from the module. A second module, which is being connected to the first module, includes an opening for receiving the insert in a manner that properly aligns the modules. In one embodiment, a fastener is used to attach a first module to a second module. The second module includes a fastener receiving portion having a counter bore which assists in guiding the fastener into engagement with the fastener receiving portion.

These and other aspects and advantages of the present invention will be apparent to those skilled in the art from the following description of the preferred embodiments in view of the accompanying drawings.

BRIEF DESCRIPTION OF THE DRAWINGS

The foregoing features of the present invention will become apparent to one skilled in the art to which the present invention relates upon consideration of the following description of the invention with reference to the accompanying drawings, in which.

DETAILED DESCRIPTION

Figure 1:
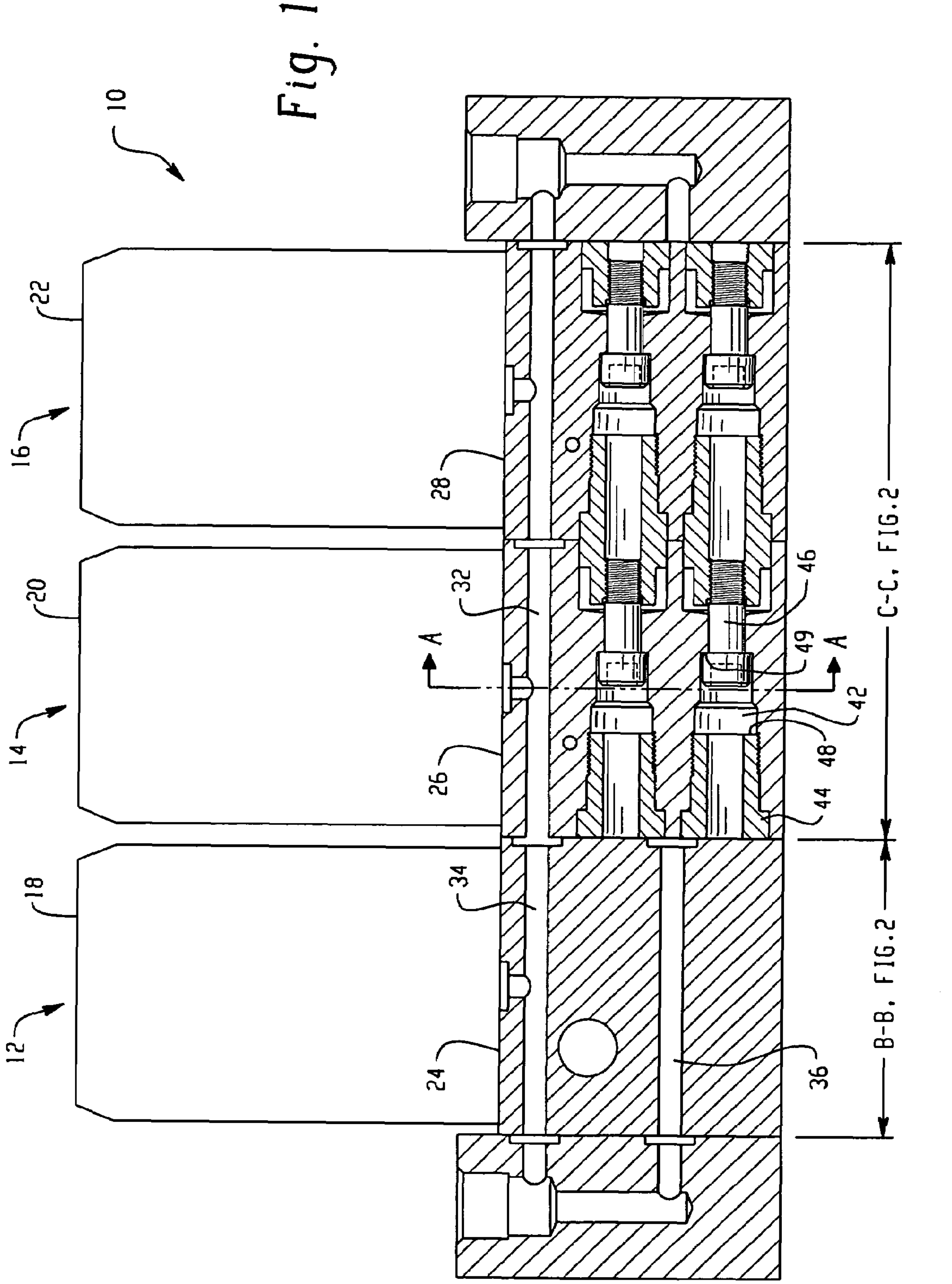
FIG. 1 is an partial cross-sectional front view of an exemplary embodiment of a modular flow system according to the present invention where a first portion is sectioned at a depth shown by line B-B in FIG. 2 and where a second portion is sectioned at a depth shown by line C-C in FIG. 2

The present invention relates to modular flow systems. More particularly, the invention relates to a modular flow system concept having individual modules that connect in a manner which allows for easy addition or removal of a module without disturbing the connection between all modules. While the invention is described with particular reference to an exemplary modular stream selecting/switching system, such description is for explanation purposes and should not be construed as a limitation on the use of the present invention.

While various aspects and concepts of the invention are described and illustrated herein as embodied in combination in the exemplary embodiments, these various aspects and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or identified herein as conventional or standard or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

Those skilled in the art will readily appreciate that the invention may be realized using a variety of materials including metal or plastic. Any number of different types of metal materials may be used for the flow system including but not limited to 316, 316L, 304, 304L, any austenitic or ferritic stainless steel, any duplex stainless steel, any nickel alloy such as HASTALLOY, INCONEL or MONEL, any precipitation hardened stainless steel such as 17-4PH for example, brass, copper alloys, any carbon or low alloy steel such as 1018 steel for example, and any leaded, re-phosphorized or re-sulphurized steel such as 12L14 steel for example. Preferably, but not necessarily, any metal materials may be included as a casting. If plastic components are used, any plastic material may preferably, but not necessarily, be included in an injection molded or thermoformed condition.

FIG. 1 illustrates an exemplary embodiment of a modular flow system 10 in accordance with the present invention. In the example illustrated by FIG. 1, the modular flow system 10 may be designed for use as a stream selection system. The stream selection system is but one of many modular flow system applications in which the invention disclosed herein could be utilized in. Additional applications for the modular flow system may include, but are not limited to, any flow components, fittings or valves, used to connect or manifold fluid passages together to create an assembly.

The modular flow system 10 includes a plurality of valve assembly/base modules 12, 14, 16. Each module 12, 14, 16 includes a valve assembly 18, 20, 22 (shown schematically) that typically, but not necessarily, controls the flow of a single sample stream. Each valve assembly 18, 20, 22 is in fluid communication with a corresponding base 24, 26, 28 and the valve assemblies 18, 20, 22 may be removably attached to the bases 24, 26, 28. The bases 24, 26, 28 are adapted to connect to each other in a manner which enables fluid communication between them. In the exemplary embodiment, the valve assemblies 18, 20, 22 are coordinated so that only a single sample stream is routed to an analyzer or other destination (not shown) through the bases 24, 26, 28, though other configurations of the modular system are possible. The exemplary modular flow system 10 in FIG. 1 is illustrated with three modules 12, 14, 16. One of ordinary skill in the art, however, will appreciate that the number of modules 12, 14, 16 used in the modular flow system 10 of the present invention can be greater or less than three.

To illustrate the configuration of the bases 24, 26, 28, FIG. 1 depicts a first base 24 sectioned at a different depth than a second base 26 and a third base 28. The configuration of the bases 24, 26, 28 is best understood with reference to both FIG. 1 and FIG. 2. In FIG. 1, the first base 24 is sectioned at a depth shown by line B-B in FIG. 2 while the second base 26 and the third base 28 are sectioned at a depth shown by line C-C in FIG. 2. Referring back to FIG. 2, a sectional side view of a base is shown along cross-section lines A-A of FIG. 1.

In the exemplary embodiment of the present invention in FIG. 1, the modules 12, 14, 16 are substantially identical. Having the modules 12, 14, 16 substantially identical simplifies the design by reducing the number of different components and making customization (adding/deleting modules) and maintenance (replacing/repairing parts) easier. Those skilled in the art, however, will appreciate that the present invention is equally applicable where the modules are not substantially identical.

Figure 2:
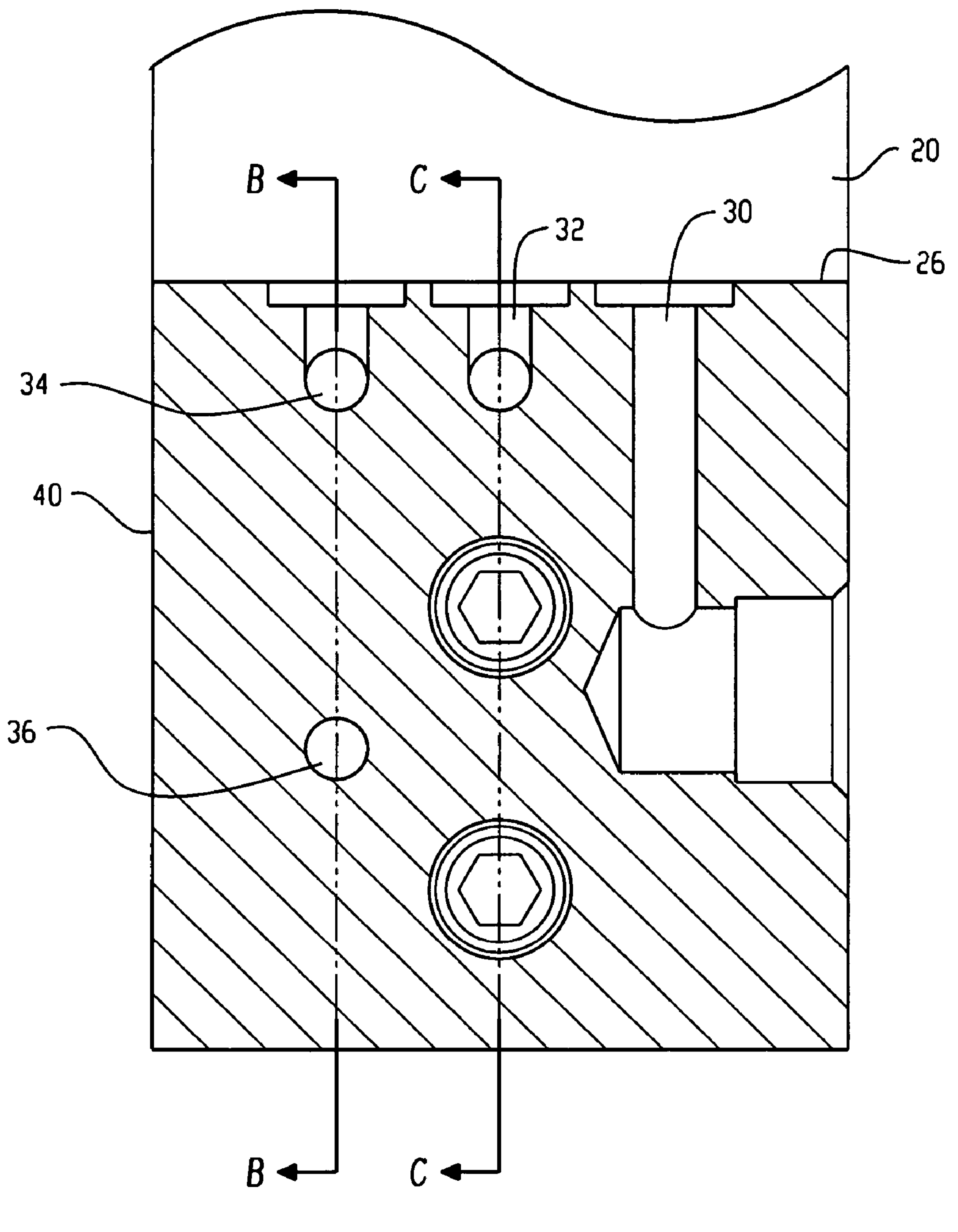
FIG. 2 is a full sectional side view of a base of the exemplary embodiment of the modular flow system shown in FIG. 1 taken along the A-A line.

Referring to FIG. 2, for ease of explanation, the base shown in FIG. 2 will be referred to as the second base 26. The description of the second base 26, however, may be equally applicable to the other bases 24, 28. The second base 26 may include at least one flow passage for receiving fluid from or directing fluid to the corresponding valve assembly 20. In the example shown in FIGS. 1 and 2, the second base 26 includes four flow passages: an inlet flow passage 30 for routing a fluid stream to the valve assembly 20, a vent flow passage 32 for routing fluid from the valve assembly 20, and an outlet flow passage realized as an integrated loop having a first section 34 and a second section 36 for routing fluid from the valve assembly to an analyzer (not shown). Those of ordinary skill in the art will appreciate that the number and configuration of the flow passages in the bases 24, 26, 28 may vary and are shown in particularity in FIGS. 1 and 2 for illustrative purposes only. For example, it is know in the art to provide an external loop in the outlet flow passage such that the base would only contain a single outlet passage. Further, the inlet passage and/or vent passages may bypass the base and be routed to and from the valve assembly by some other means.

The modular flow system 10 provides for individual modules to connect in a manner which allows for easy addition or removal of modules without the need for or risk of disturbing the connection between all the modules. For example, the modules may be connected in series and may be disconnected, in reverse order, one at a time without disturbing the connection between the other modules. Thus, the connection between two modules may be independent of the connection to other modules. Furthermore, each module may be configured as a complete assembly of the components required to join two modules together. For example, a mechanism used to connect two modules may remains with or be retained in one of the modules when disassembled.

Referring to the example in FIG. 1, each base 24, 26, 28 may include a bore, an insert and a fastener. To generally explain the connection between the bases 24, 26, 28, the second base 26 is described in more detail. The second base 26 may include a first component 40 (FIG. 2), which may be realized in the form of a body having an internal through bore 42 to facilitate attaching to an adjacent base, for example the first base 24. The first component 40 may join or connect with a second component 44 which may be realized in the form of an insert. The insert 44 may attach to the body 40 while extending from the body 40 to be received by the first base 24. The insert 44 may attach to the body 40 in a variety of ways, such as for example, by a threaded connection. By attaching to the body 40 and being received by the first base 24, the insert 44 assists proper alignment between the first base 24 and the second base 26. Those, skilled in the art, however, will appreciate that the insert 44 need not be configured to extend from the body 40. Two bases may be aligned by means other than the insert 44. For example, two bases may use alignment pins and guide holes to achieve proper alignment.

The second base 26 includes a third component 46 which may be realized in the form of a fastener. The fastener 46 resides within the bore 42 of the body 40. The second base 26 further includes a first fastener engaging surface 48 and a second fastener engaging surface 49 which cooperate to capture or retain the fastener 46 within the bore 42. One or both engaging surfaces 48, 49 may be realized as part of an insert, such as the insert 44, if an insert is employed. The particular characteristics of the bases 24, 26, 28 and the manner in which the bases 24, 26, 28 attach is described in greater detail below with reference to FIGS. 3-4.

Figure 3:
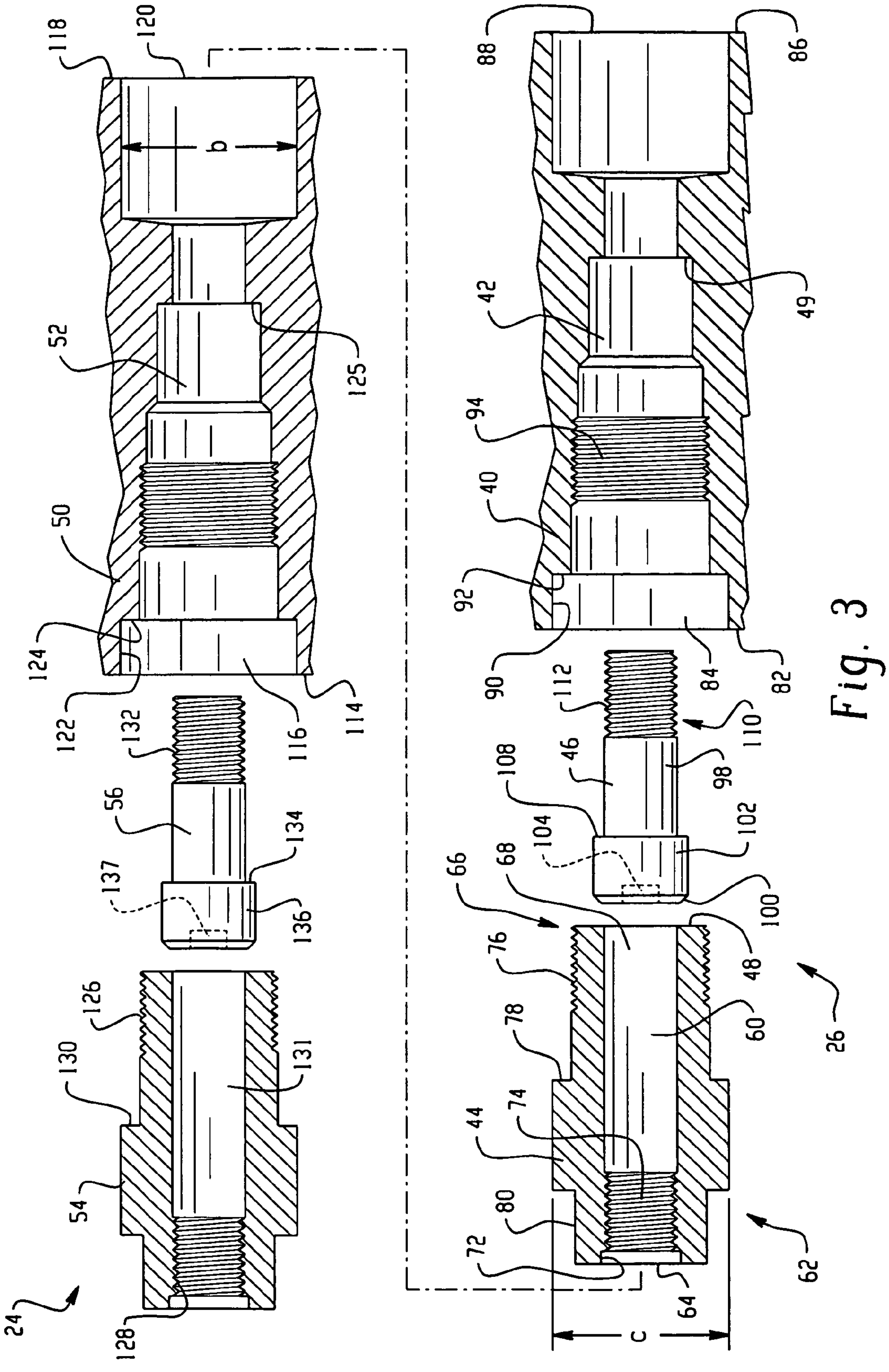
FIG. 3 is an exploded sectional view of two bases of the exemplary embodiment of the modular flow system shown in FIG. 1, enlarged to shown two captivated fastener assemblies.
Figure 4:
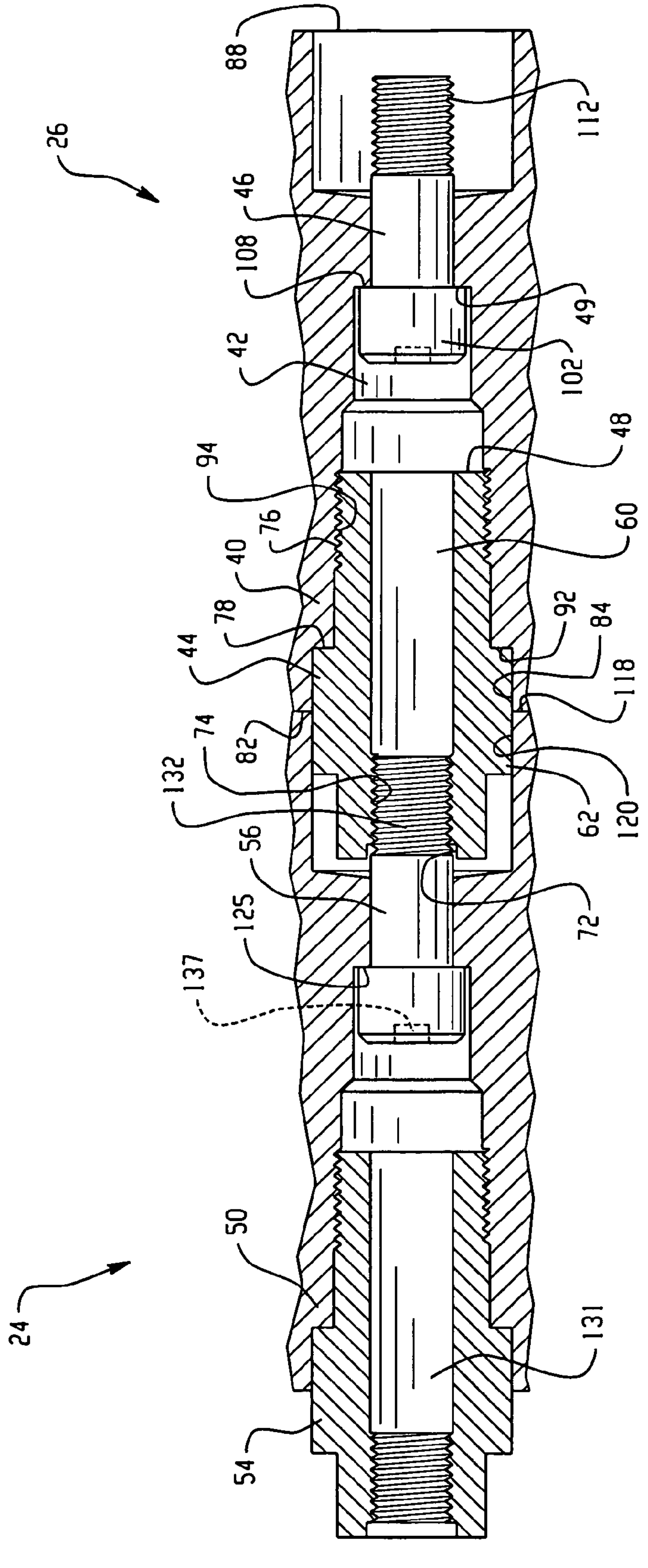
FIG. 4 is an enlarged sectional view of two bases of the exemplary embodiment of the modular flow system shown in FIG. 1 with the bases in an installed condition, enlarged to shown two captivated fastener assemblies.

FIGS. 3-4 illustrate enlarged sectional views of two bases 24, 26 of the exemplary modular flow system 10 of FIG. 1. The first base 24 may include a body 50, a bore 52, an insert 54, and a fastener 56, similar to those described in relation to the second base 26. For illustrative purposes, FIGS. 3-4 depict each base 24, 26 having a single bore, insert, and fastener. Each base, however, may include multiple bores, inserts, and fasteners to facilitate attaching the bases together to form a fluid tight connection. For example, in FIG. 1 each base includes two bores with inserts and fasteners.

With regard to the second base 26 in FIGS. 3-4, the insert 44 may be generally cylindrical and defines a central through bore 60. The insert 44 includes a first end 62 having a first opening 64 and a second end 66 having a second opening 68. The second end 66 may define the first fastener engaging surface 48, realized as an annular radially extending surface adjacent the second opening 68. The first end 62 is adapted to be received by an adjacent base, for example the first base 24, as described in detail below. In the exemplary embodiment of the present invention in FIGS. 3-4, the insert 44 is illustrated as being generally cylindrical. The insert 44, however, can be configured in a variety of shapes which can depend on, for example, whether the insert 44 is received by an adjacent base, the shape of the opening in the adjacent base in which the first end 62 is received, and how the insert 44 connects with the body 40.

The first opening 64 of the first end 62 is adapted to receive a fastener and includes a counter bore 72 adjacent to the first opening 64 and a female threaded portion 74. The second end 66 includes a male threaded portion 76 and a radially extending exterior shoulder 78. A portion of the exterior surface 80 of the insert 44 may include a tool engaging portion (not shown) allowing a tool to engage and turn the insert 44. For example, a hex-shaped exterior surface may be provided. The tool engaging portion (not shown), however, may be internal to the insert 44 rather than external.

The body 40 is generally block-shaped with a first end 82 having a first opening 84 and a second end 86 having a second opening 88. The body 40 is connected in a fluid tight manner with an adjacent body, for example the body 50 of the first base 24. Those of ordinary skill in the art will appreciate that the body 40 can be configured in a variety of shapes and sizes and achieve a fluid tight connection with an adjacent body.

The body 40 defines an axially aligned bore 42 connecting the first opening 84 to the second opening 88. The body 40 further includes a counter bore 90 adjacent to the first opening 84. The counter bore 90 has a radially extending inner surface 92. The body 40 further includes a female threaded portion 94 and a second fastener engaging surface 49 that may be realized as an interior shoulder. The female threaded portion 94 is adapted to threadably engage the male threaded portion 76 of the insert 44.

The fastener 46 is generally cylindrical with an elongated shank 98. The fastener includes a first end 100 defining a head portion 102. The head portion 102 includes a tool engaging portion 104 allowing a tool to engage and turn the fastener 46. In the exemplary embodiment of FIGS. 3-4, the tool engaging portion 104 is realized as a hex shaped cavity for receiving a hex-shaped key (not shown). The tool engaging portion 104, however, can be external to the fastener 46 and may be configured other than hex-shaped. The head portion 102 is connected to the shank 98 by a radial surface 108. The second end 110 of the fastener 46 includes a male threaded portion 112 adapted to threadably engage an adjacent base or body.

The first base 24 may include three components, a body 50, an insert 54, and a fastener 56, that are substantially similar to those described in relation to the second base 26. Specifically, the first base 24 may include a body 50 with a first end 114 having a first opening 116 and a second end 118 having a second opening 120 connected by the axially aligned bore 52. The body 50 may include a counter bore 122 adjacent to the first opening 116 which includes an inner surface 124 for engaging the insert 54. In addition, the body 50 may include a second fastener engaging surface 125 that may be realized in the form of an interior shoulder. The insert 54 may include a male threaded portion 126, a female threaded portion 128, an exterior shoulder 130, and a through bore 131. Finally, the first base 24 may include a fastener 56 having a male threaded portion 132, a radial surface 134, and a head portion 136 with a tool engaging portion 137.

Referring to FIG. 4, the first base 24 and the second base 26 are illustrated in an installed configuration, i.e. the captivated fastener 56 of the first base 24 attaches the first base 24 to the second base 26. The fastener 46 of the second base 26 is disposed within the bore 42 of the body 40. When positioned within the bore 42, the fastener 46 is aligned so that the male threaded portion 112 of the fastener 46 is toward the second opening 88. The interior shoulder 49 of the body 40 may abuttingly engage the radial surface 108 of the fastener 46. The engagement between the radial surface 108 and the interior shoulder 49 prevents further axial movement of the fastener 46 toward the second opening 88. The length of the fastener 46 prevents the male threaded portion 112 of the fastener 46 from extending beyond the second opening 88 when the fastener 46 is positioned within the bore 42.

In the installed configuration, the engaging surface 48 of the insert 44 of the second base 26 and the interior shoulder 49 of the body 40 provide a means for retaining or capturing the fastener 46 within the bore 42. Thus, the fastener 46 cannot be lost or dropped during assembly because it is captive. The body 40 receives the insert 44 through the first opening 84. The male threaded portion 76 of the insert 44 is adapted to threadably engage the female threaded portion 94 of the body 40. The head 102 of the fastener 46 is too wide to fit through the through bore 60 of the insert 44. Therefore, in the installed configuration, the insert 44 prevents the fastener 46 from exiting the bore 42 via the first opening 84, i.e. the fastener engaging portion 48 of the insert 44 will contact the head 102 of the fastener 46 and block the fastener 46 from further axial movement toward the first opening 84.

In addition, in the installed configuration, the exterior shoulder 78 of the insert 44 engages the inner surface 92 of the body 40. The engagement between the insert shoulder 78 and the inner surface 92 allows the user to torque the insert 44 to a predetermined torque setting. Further, the first end 62 of the insert 44 may extend axially from the first opening 84 of the body 40. The second opening 120 of the first base 24 slideably receives the first end 62 of the insert 44.

In the exemplary embodiment of FIG. 3-4 of the present invention, the first end 62 of the insert 44 is generally cylindrical. The diameter c of the first end 62 is slightly smaller that the diameter b of the second opening 120 of the first base 24. Therefore, when the second end 118 of the first body 50 and the first end 82 of the second body 40 are in contact, the first end 62 of the insert 44 is slideably received by the second opening 120 of the first body 50. In this manner, the insert 44 assists in properly aligning the first and second bases 24, 26.

As described in relation to the second base 26, the fastener 56 of the first base 24 is retained within the body 50 by the interior shoulder 125 and the insert 54. The male threaded portion 132 of the fastener 56 is adapted to threadably engage the female threaded portion 74 of the insert 44 installed in the second base 26, and thus act as a means for fastening the first base to the second base. To threadably engage the captured the fastener 56 with the insert 44 in the second body 40, an elongated hex key (not shown) may be inserted through the through bore 131 in the insert 54 in the first body 50 to engage the tool engaging portion 137 of the fastener 56. The length of the through bore 131 in the insert and the length of the bore 52 aid the alignment of the hex key (not shown with the fastener 56 to reduce the likelihood of stripping the hex key.

The counter bore 72 of the insert 44 assists in guiding the fastener 56 into threaded engagement with the insert 44. Threading the fastener 56 into the insert 44 results in the first end 62 of the insert 44 being slideably received by the second opening 120 of the first body 50. This further results in the second end 118 of the first body 50 engaging the first end 82 of the second body 40. Sufficient tightening of the fastener 56 creates a force between the first base 24 and second base 26 that establishes leak-free fluid communication between the bases. Seals (not shown) may be provided between the bases to aid in preventing leaks. In a tie-rod system as described in relation to the prior art, all of the modules of the flow system are connected at the same time. In the flow system 10, connection between modules may occur one connection at a time, thus the seals formed between the bases are established one seal at a time, increasing the reliability of the seals.

In the exemplary embodiment, the connection between two bases, such as the first and second bases 24, 26, may be independent of the connection to other bases. As a result, an individual base can be added or removed without disturbing the connection with other bases that were connected beforehand. For example, in FIG. 1 the first base 24 may be removed without disturbing the connection between the second base 26 and the third base 28. Further, because the insert 44 and the fastener 56 are independent components, the insert 44 may be installed with a higher torque than the fastener 56. As a result, loosening the fastener 56 does not disturb the connection between the insert 44 and the body 40 or the connection between subsequent bases in the modular flow system 10.

Figure 5:
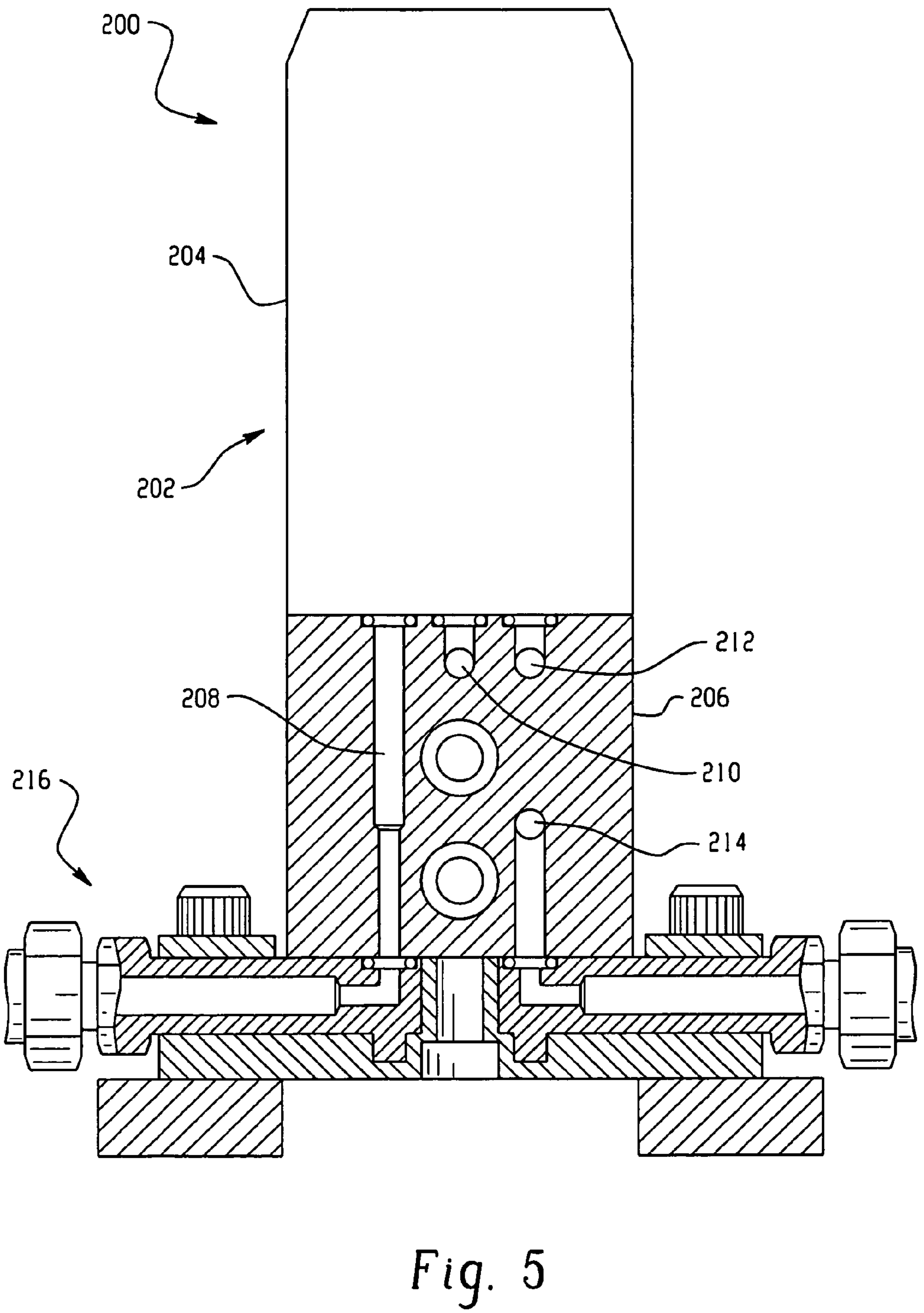
FIG. 5 is a sectional side view of another exemplary embodiment of a modular flow system according to the present invention.

FIG. 5 illustrates a second exemplary embodiment of the modular flow system in accordance with the present invention. In the example illustrated by FIG. 5, the modular flow system 200 may be substantially similar to the modular system 100 of FIGS. 1-4. In particular, the modular system 200 may include a module 202 having a valve assembly 204 removably attached to and in fluid communication with a base 206. The modular system in FIG. 5 illustrates only a single module 202 since it is a side sectional view. The system 200, however, may include a plurality of modules connected as described for the module system 100 of FIGS. 1-4.

Similar to the base 26 of the modular system 100, the base 206 may include four flow passages: an inlet flow passage 208 for routing a fluid stream to the valve assembly 204, a vent flow passage 210 for routing fluid from the valve assembly, and an outlet flow passage realized as an integrated loop having a first section 212 and a second section 214 for routing fluid from the valve assembly to an analyzer or other device (not shown). The base 206, however, may route the inlet flow passage 208 and the second section of the outlet flow passage 214 to the bottom of the base 206. The term "bottom" is used for convenient reference to the drawings, and is not meant to require or limit the orientation of the system.

Providing the inlet flow passage 208 and outlet flow passage 214 through the bottom of the base 206 allows the modules to mount to a surface mount manifold arrangement 216, including but not limited to, the surface mount manifold system disclosed by United States Patent Application Publication No. 2004/0168732, published on Sep. 2, 2004, titled "Modular Surface Mount Fluid System," which is incorporated herein by reference in its entirety. In another embodiment, the vent flow passage 208 may also extend through the bottom of the base 206.

The footprint of the modular system 200 may be configured to match the footprint required by any surface mount manifold system. For example, the size of the modules and the spacing and location of the flow passages may correspond to the footprint required by substrate and manifold components of Swagelok's Modular Platform Components (MPC) System.

Figure 6:
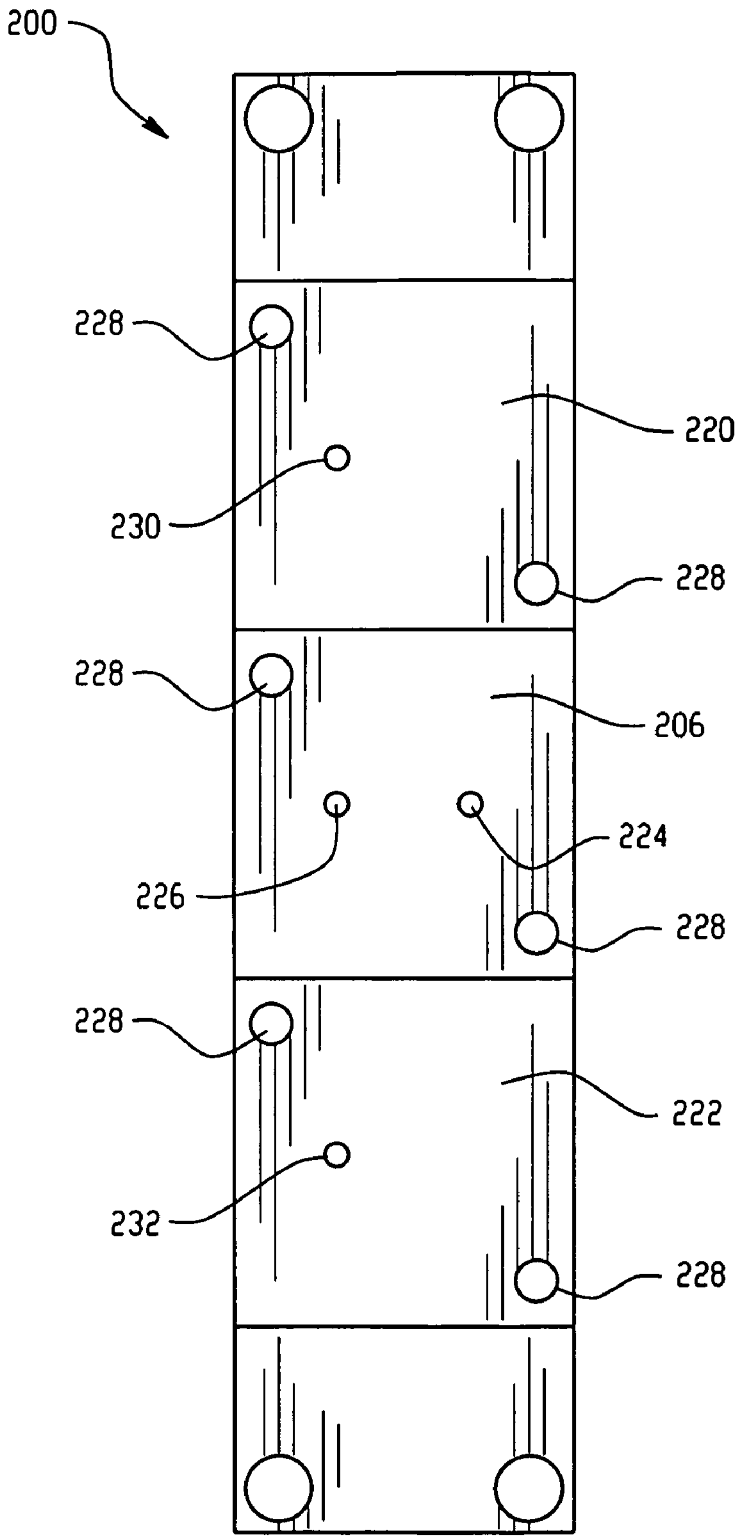
FIG. 6 is a bottom view of the modular flow system of FIG. 5.

In the example in FIG. 6, a bottom view of three bases of the modular system 200 are illustrated, though less than or more than three modules may be used. In particular, the base 206 may be positioned between a second base 220 and a third base 222. The base 206 may include a outlet port 224 for routing fluid from the valve assembly 204 to the surface mount manifold 216 (FIG. 5), an inlet port 226 for routing fluid from the surface mount manifold to the valve assembly 204, and a plurality of mounting holes 228 for mounting the base 206 to the surface mount manifold (not shown). The second base 220 and the third base 222 may also include mounting holes 228 for mounting the modules to the manifold and an inlet ports 230, 232, respectively.

The invention has been described with reference to the preferred embodiments. Modification and alterations will occur to others upon a reading and understanding of this specification. It is intended to include all such modifications and alterations insofar as they come within the scope of the appended claims or the equivalents thereof.

The invention claimed is:

1. A modular flow system, comprising:

a first body having a throughbore;

a fastener disposed within the throughbore;

an insert having a first end adapted to threadably couple to the first body and a second end that extends out of the first body and is adapted to be received in an opening on a second body, which is adjacent the first body, to align the second body with the first body;

wherein the insert and the first body cooperate to retain the fastener with the bore.

2. The modular flow system of claim 1 wherein the first end of the insert comprises a male thread and the second end of the insert comprises a female thread.

3. The modular flow system of claim 2 wherein the first end of the insert threadably engages female threads in the throughbore of the first body.

4. The modular flow system of claim 1 wherein the fastener is retained entirely within the throughbore.

5. The modular flow system of claim 1 wherein the insert includes a throughbore.

6. The modular flow system of claim 1 wherein the first body includes an interior shoulder and the insert includes an annular engagement surface that cooperate to retain the fastener within the bore.

7. The modular flow system of claim 1 wherein the throughbore has a first end, a second end, and an intermediate portion, and wherein the diameter of the intermediate portion is smaller than the diameter of the first end and the second end.

8. A modular system, comprising:

a first body having a throughbore;

an insert adapted to threadably couple to the first body; and a fastener disposed within the throughbore, wherein the insert and the first body cooperate to retain the fastener entirely within the throughbore, wherein a first end of the insert comprises a male thread and a second end of the insert comprises a female thread.

9. The modular flow system of claim 8 wherein the first end of the insert is adapted to couple to the body and the second end of the insert extends out of the first body and is adapted to be received in an opening on a second body, which is adjacent the first body, to align the second body with the first body.

10. The modular flow system of claim 8 wherein the first end of the insert threadably engages female threads in the throughbore of the first body.

11. The modular flow system of claim 8 wherein the insert includes a throughbore.

12. The modular flow system of claim 8 wherein the throughbore has a first end, a second end, and an intermediate portion, and wherein the diameter of the intermediate portion is smaller than the diameter of the first end and the second end.

13. A modular system, comprising:

a first base comprising:

a body having a throughbore;

a fastener disposed within the throughbore; and an insert having a first end adapted to threadably couple to the body and a second end that extends out of the body; and a second base adjacent the first base, the second base having an opening that receives the second end of the insert to align the second base with the first base.

14. The modular flow system of claim 13 wherein the insert and the body cooperate to retain the fastener entirely within the throughbore.

15. The modular flow system of claim 13 wherein the first end of the insert comprises a male thread and the second end of the insert comprises a female thread.

16. The modular flow system of claim 15 further comprising a second fastener associated with the second base, wherein the insert is threadably coupled to the body at a first amount of torque, and the second fastener is threadably coupled to the insert at a second amount of torque that is less than the first amount of torque.

17. The modular flow system of claim 15 wherein the first end of the insert threadably engages female threads in the throughbore of the body.

18. The modular flow system of claim 13 further comprising means for retaining the fastener within the throughbore.

19. The modular flow system of claim 13 wherein the throughbore has a first end, a second end, and an intermediate portion, and wherein the diameter of the intermediate portion is smaller than the diameter of the first end and the second end.

20. A method for connecting modules in a modular flow system, comprising:

disposing a first fastener within a bore in a first module;

threadably coupling an insert to the first module such that the insert and the first module cooperate to retain the first fastener within the bore, wherein an end of the insert extends out of the first module;

placing a second module adjacent the first module such that an opening on the second module receives the end of the insert to align the first module with the second module; and engaging the insert with a second fastener associated with the second module to attach the first module to the second module.

21. The method of claim 20 wherein the first fastener is retained entirely within the bore.

22. The method of claim 20 wherein the step of engaging the insert with a second fastener further comprising threadably coupling the second fastener to the insert.

23. The method of claim 22 wherein the insert is threadably coupled to the first module at a first amount of torque, and the second fastener is threadably coupled to the insert at a second amount of torque that is less than the first amount of torque.

24. A modular flow system, comprising:

a first body having a throughbore;

a fastener disposed within the throughbore;

a single-piece insert having a first end adapted to couple to the first body and a second end that extends out of the first body and is adapted to be received in an opening on a second body, which is adjacent the first body, to align the second body with the first body;

wherein the single-piece insert and the first body cooperate to retain the fastener with the bore.

25. The modular flow system of claim 24 wherein the single-piece insert is adapted to threadably couple to the first body.

26. The modular flow system of claim 24 wherein the fastener is retained entirely within the throughbore.

27. The modular flow system of claim 24 wherein the second end of the single-piece insert is adapted to threadably engage with a second fastener while received in the opening on the second body to attach the first body to the second body.

28. The modular flow system of claim 27 wherein the single-piece insert is threadably coupled to the first body at a first amount of torque and the second fastener is threadably coupled to the single-piece insert at a second amount of torque that is less than the first amount of torque.

29. A modular system, comprising:

a first body having a throughbore;

a single-piece insert adapted to couple to the first body; and a fastener disposed within the throughbore, wherein the single-piece insert and the first body cooperate to retain the fastener entirely within the throughbore.

30. The modular flow system of claim 29 wherein the single-piece insert is adapted to threadably couple to the first body.

31. The modular flow system of claim 29 wherein the single-piece insert further comprises a first end adapted to couple to the body and a second end that extends out of the first body and is adapted to be received in an opening on a second body, which is adjacent the first body, to align the second body with the first body.

32. The modular flow system of claim 29 wherein the second end of the single-piece insert is adapted to threadably engage with a second fastener while received in the opening on the second body to attach the first body to the second body.

33. The modular flow system of claim 32 wherein the single-piece insert is threadably coupled to the first body at a first amount of torque and the second fastener is threadably coupled to the single-piece insert at a second amount of torque that is less than the first amount of torque.

34. An assembly method for modules in a modular flow system, comprising:

attaching an insert to a bore in a first module, wherein an end of the insert extends out of the first module;

placing a second module adjacent the first module such that a bore in the second module receives the end of the insert to align the first module with the second module;

inserting a fastener within the bore of the second module; and attaching the fastener to the end of the insert that is within the bore in the second module to secure the first module to the second module.

35. The method according to claim 34 further comprising attaching a second insert to the bore in the second module, wherein the second insert cooperates with the second module to retain the fastener within the bore of the second module.

36. The method according to claim 35 wherein the fastener is retained entirely within the bore.

37. The method according to claim 35 further comprising engaging the fastener, though a bore in the second insert, to detach the fastener from the end of the first insert that is within the bore of the second module.

38. The method according to claim 34 wherein the fastener is threadably engaged with the end of the insert.

39. A modular flow system, comprising:

a first body having a throughbore;

a fastener disposed within the throughbore, the fastener adapted to couple to a second body to attach the first body to the second body, and an insert having a throughbore, a first end adapted to couple to the throughbore of the first body, and a second end that extends out of the first body and is adapted to be received in an opening on a third body to align the third body with the first body, wherein the fastener is accessible through the throughbore in the insert to decouple the fastener from the second body while the insert is coupled to the first body.

40. The modular flow system according to claim 39 wherein the fastener is retained entirely within the throughbore.

41. The modular flow system according to claim 39 wherein the insert is adapted to threadably engage to the first body.

42. The modular flow system according to claim 39 wherein the fastener is adapted to threadably engage the second body to attach the first body to the second body.

* * * * *